United States Patent [19]

Kiencke et al.

[11] 4,285,314
[45] Aug. 25, 1981

[54] SYSTEM TO DECREASE OPERATING JOLTS IN A VEHICLE BY CONTROLLING FUEL AND IGNITION TIMING OF AN INTERNAL COMBUSTION ENGINE THEREIN

[75] Inventors: Uwe Kiencke; Werner Jundt, both of Ludwigsburg; Karl Seeger, Ditzingen, all of Fed. Rep. of Germany

[73] Assignee: Robert Bosch GmbH, Stuttgart, Fed. Rep. of Germany

[21] Appl. No.: 52,342

[22] Filed: Jun. 27, 1979

[30] Foreign Application Priority Data

Aug. 8, 1978 [DE] Fed. Rep. of Germany ....... 2834638

[51] Int. Cl.³ ............................................... F02P 5/14
[52] U.S. Cl. .................................... 123/422; 123/325; 123/329; 123/333; 123/416; 123/423; 123/632
[58] Field of Search ............... 123/325, 329, 333, 416, 123/422, 423, 493, 198 DB, 487, 632

[56] References Cited

U.S. PATENT DOCUMENTS

| 3,736,910 | 6/1973 | Raff ....................... 123/493 |
| 3,978,833 | 9/1976 | Crall et al. ............... 123/416 |
| 4,075,988 | 2/1978 | Kato ...................... 123/333 |
| 4,088,106 | 5/1978 | Borst et al. .............. 123/416 |
| 4,127,092 | 11/1978 | Fresow et al. ........... 123/416 |
| 4,198,933 | 4/1980 | Sieber et al. ............ 123/333 |

Primary Examiner—Charles J. Myhre
Assistant Examiner—Andrew M. Dolinar
Attorney, Agent, or Firm—Frishauf, Holtz, Goodman & Woodward

[57] ABSTRACT

In an internal combustion engine in which the fuel supply is interrupted during no-load operation to save gas the ignition timing is retarded following resumption of the fuel supply to cause the resumed torque to be applied slowly. A sequence of ignition timing signals following the activation of the gas pedal is delayed by sequentially smaller and smaller amounts until the normal ignition timing is resumed.

17 Claims, 3 Drawing Figures

SYSTEM TO DECREASE OPERATING JOLTS IN A VEHICLE BY CONTROLLING FUEL AND IGNITION TIMING OF AN INTERNAL COMBUSTION ENGINE THEREIN

The present invention relates to internal combustion engines and, more particularly, to internal combustion engines in motor vehicles. In particular, it is concerned with decreasing operating jolts when the fuel supply to the engine is either decreased or completely shut off during no-load operation and is subsequently increased again at the end of the no-load operation or if the speed of the engine is less than a predetermined minimum speed.

BACKGROUND AND PRIOR ART

A motor vehicle engine control system is known (see German disclosure document DE-OS 26 26 862) in which, the fuel supply is increased to the normal supply immediately upon ending of no-load operation or if the engine speed is less than the predetermined minimum speed. The sudden increase in fuel supply can result in undesired higher jolts resulting from sudden torque applications to the engine and, if the engine is in a motor vehicle, to the vehicle and to passenger.

THE INVENTION

In accordance with the present invention, the above-mentioned jolt is substantially decreased by delay means which delay the first ignition timing signal occurring after the start of the resumption of the fuel supply, thereby retarding the ignition timing. This retardation of the ignition timing reduces the torque considerably and therefore results in smooth acceleration. For a particularly soft application of torque, a plurality of ignition timing signals following the start of the resumption of fuel supply are delayed, each by an amount less than that of the last previous one. The delay of the ignition timing signals is accomplished by increasing the width of the closure angle signal, for example by adding an additional angle signal thereto. The width of the additional angle signal, in one example, is created by the counting down of a counter. For this example, the width of the additional angle signal can be varied either by changing the countdown rate or changing the value of the count to which the counter is preset. The counter can be preset to a speed-dependent signal by a further counter which is reset periodically by the ignition timing signal and which counts continuously between the ignition timing signals and the count on which therefore constitutes a speed-dependent signal.

In a preferred embodiment, the speed-dependent signal is applied to a comparator whose output furnishes a speed-limiting signal cutting off the fuel supply if the count indicates an engine speed exceeding a predetermined maximum speed. This allows a speed-limiting action to be carried out with minimum equipment. It is also more reliable than those systems in which the ignition is interrupted when the speed becomes excessive.

In systems wherein a speed-dependent counter is provided to allow the interruption of current through the ignition output stage when the engine speeds is less than a predetermined minimum speed, the outputs of the counter can also be used, following application to a comparator, to furnish a signal initiating the operation of the fuel decreasing means under no-load conditions when the speed of the engine exceeds a first predetermined speed and to cause a resumption of the fuel supply if, even under no-load conditions, the speed of the engine is less than a second predetermined speed.

The digital circuits used in the present invention also facilitate the use of integrated circuits.

BRIEF DESCRIPTION OF THE DRAWING

In FIG. 1, the part of the system enclosed by broken line 10 is the equipment required to decrease or completely shut off the fuel supply, while the remainder of the equipment lying outside of line 10 shows an ignition system as, for example disclosed in DE-OS 2,701,968, to which U.S. Pat. No. 4,174,696 corresponds which has apparatus which cuts off quiescent current in the ignition output stage.

Figure 1:
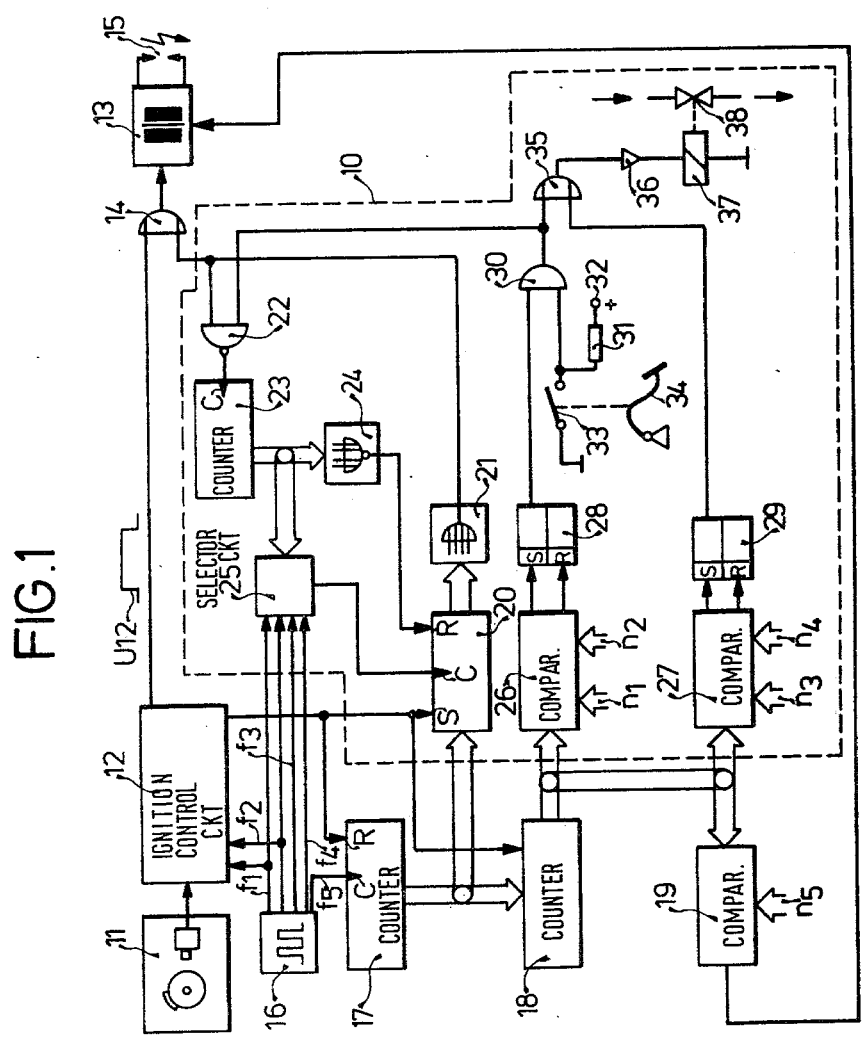
FIG. 1 is a block diagram of the preferred embodiment of the present invention.

The known part includes a signal generator 11 connected preferably to the crankshaft of an internal combustion engine. The signals generated by stage 11 are applied to an ignition control circuit 12, which, in turn, furnishes a sequence of closure angle signals, $U_{12}$. The closure angle signals $U_{12}$ are applied to an ignition output stage 13 via an OR gate 14. Ignition output stage 13 is a well known stage described in greater detail in the above-mentioned publication and, in general comprises a transistor whose emitter-collector circuit is connected in series with the primary winding of an ignition coil. The secondary winding of the ignition coil is connected to a spark plug 15. While the closure angle signal is being applied to the ignition output stage, the emitter-collector circuit of the transistor is in a conductive state, causing magnetic energy to be stored in the coil. At the end of the closure angle signal, the transistor blocks thereby inducing a spark at spark coil 15. The trailing edge of the closure angle signal is herein referred to as the ignition timing signal.

A frequency generator 16 generates signals of five frequencies, namely frequency F1, F2, F3, F4 and F5. The signals of frequencies F1 and $F_2$ are applied to ignition control circuit 12, while the signal of frequency F5 is applied to the counting input C of a digital counter 17. The reset input R of counter 17 is connected to ignition control circuit 12, counter 17 being reset by the trailing edge of each closure angle signal, that is by each ignition timing signal. The counting outputs of counter 17 are connected to the counting inputs of a buffer storage 18 which is also a counter. The reset input of counter 18 is connected to ignition control circuit 12 so that counter 18 is set in response to each ignition timing signal. If necessary, a small delay may be provided between ignition control circuit 12 and counter 17, so that this counter is not reset until its contents have been taken over by counter 18. The counting outputs of buffer storage 18 are connected to a set of first inputs of a digital comparator 19. The second inputs of comparator 19 receive a number which corresponds to a very low engine speed n5. The output of comparator 19 is connected to ignition output stage 13. A signal at the output of comparator 19 causes the current in the ignition output stage to be interrupted. This is accomplished in a known manner by, for example, connecting the base of the transistor in the ignition output stage to ground potential. Such circuits are described in the aforementioned publications.

The additional equipment enclosed by line 10 includes a counter 20 whose counting inputs are connected to the counting outputs of counter 17. The set input of counter 20 is connected to the set input S of buffer storage 18. The counting outputs of counter 20 are connected to the inputs of a decoder 21 which, more particularly is a zero detect circuit. The output of zero detect circuit 21 is connected to a further input of OR gate 14, and is also connected to the input of a NAND gate 22. Zero dector 21 may, for example, be an OR gate. The OR gate furnishes a "1" signal for any count other than the count of zero. The output of NAND gate 22 is connected to the clock input C of a further counter 23. The counting inputs of counter 23 are connected to a further zero detect circuit 24. The output of zero detect circuit 24 is connected to the reset input of counter 20. The counting outputs of counter 23 are further connected with the control input of a selector circuit 25. A selector circuit 25 connects one of the signals of frequency F1 to F4 to the counting input C of counter 20. A selector circuit 24 which connects one of a plurality of inputs to an output in dependence upon a binary number applied to a set of control inputs, may be a multiplexer such as is commercially available as unit 4052.

The counting outputs of buffer storage 18 are further connected to the counting inputs of two digital comparators 26, 27. Comparator 26 has two sets of comparator inputs receiving, respectively, binary numbers n1 and n2. These numbers are preferably hard wired. A first and second output of comparator 26 is connected, respectively, to the set and reset input of a flip-flop 28. If the number stored in counter 18 is less than the number n2, a set signal for flip-flop 28 is generated. If, however, the number stored in counter 18 exceeds the number n1, then a reset signal is applied. Similarly, comparator 27 has two sets of inputs receiving, respectively, the numbers n3 and n4. If the number stored in buffer storage 18 is less than n4 a flip-flop 29 is set. If the number stored in buffer storage 18 exceeds n3, flip-flop 29 is reset. Commercially available comparators MC14585 may be used for comparators 26 and 27. The output of flip-flop 28 is connected to one input of an AND gate 30. The second input of AND gate 30 is connected through a resistor 31 to the positive side, 32, of the voltage supply and through a switch 33 activated by gas pedal 34 to reference or ground potential. Switch 33 is open under no-load conditions, that is when the driver's foot is removed from gas pedal 34. When gas pedal 34 is activated, switch 33 closes.

The output of AND gate 30 is connected to a further input of NAND gate 22. It is also connected to the input of an OR gate 35 whose second input is connected to the output of flip-flop 29. The output of OR gate 35 is connected through an amplifier 36 and a magnet winding 37 to reference or ground potential. Magnet winding 37 controls a valve 38 which interrupts the fuel supply to the internal combustion engine. The valve 38 is preferably arranged in the carburetor of the engine and either interrupts or decreases the fuel supply to the inlet pipe. For an internal combustion engine having electronic fuel injection, the output signal of AND gate 35 can be used to close the injection valves.

Operation

Figure 2:
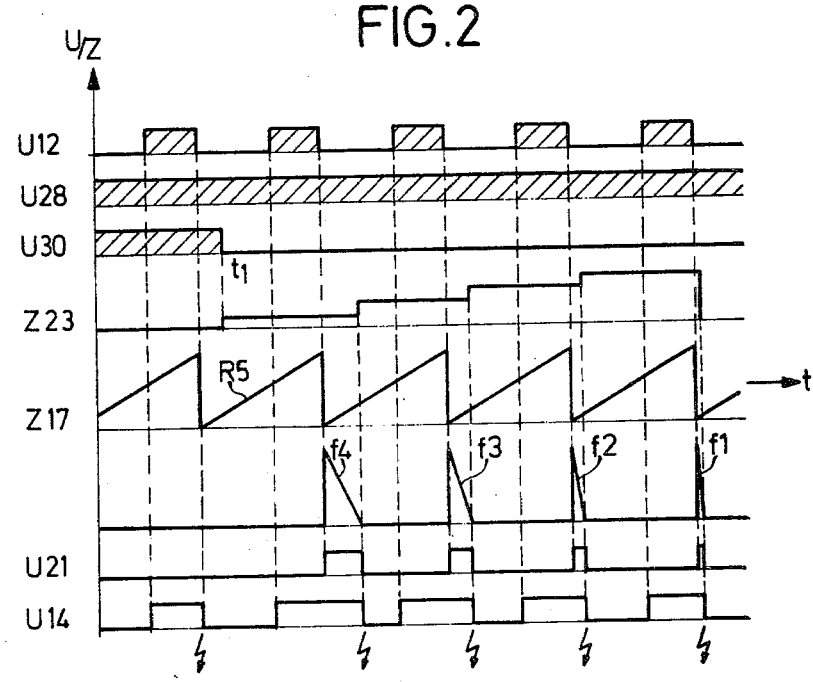
FIG. 2 shows a set of timing diagrams illustrating the operation of slow reduction of the ignition time retardation.

The operation of the circuitry outside of broken line 10 will first be discussed, also with reference to FIG. 2. As mentioned previously, ignition control circuit 12 generates the closure angle signal $U_{12}$. Counter 17 is an up counter and counts periodically upwards at a frequency F5 until reset by the trailing edge of signal $U_{12}$. The count on counter 17 is thus greater the lower the engine speed. Just prior to the resetting of counter 17, the count on the counter is transferred to buffer storage 18. The count on counter or buffer storage 18 is thus a speed-dependent signal or number. This signal is applied to comparator 19 and is compared to the number n5 which corresponds to a very low engine speed, for example 40 revolutions per minute. Such a low engine speed never occurs under normal operation of an internal combustion engine. If such a speed is reached, or if the engine speed is actually lower than such a speed, this shows that the engine is no longer operating. In this case the output signal of comparator 19 interrupts the current through ignition output stage 13 and therefore prevents the flowing of a quiescent current. In a particularly simple embodiment, buffer storage 18 may be eliminated.

To explain the operation of the equipment inside broken line 10 which interrupts the fuel supply to the engine, let it first be assumed that the engine speed is higher than the speed corresponding to the number n2. The value stored in counter 18 is therefore less than n2, causing flip-flop 28 to be set. If now gas pedal 34 is released, the engine is operating under no load and switch 33 opens. This causes a signal U30 to appear at the output of AND gate 30. Signal U30 causes magnet winding 37 to be energized and valve 38 to close. The fuel supply is interrupted and the fuel which would otherwise be supplied to the engine is saved. At time t1 the gas pedal is reactivated and switch 33 closes. The output of AND gate 30 changes to a "0" signal causing magnet winding 37 to be deenergized and the fuel supply to resume. The trailing edge of signal U30 also causes a counting signal for counter 23 to be generated by NAND gate 22. The binary number 1 thus appears at the counting outputs of counter 23. Zero detect circuit 24 no longer furnishes an output signal and the blocking of counter 20 resulting from the continuous application of a reset signal is removed. Simultaneously, the signal of frequency f4 is applied to the counting input of counter 20. Since counter 20 is a down counter, the count remains at zero until the time of the next ignition signal, namely the trailing edge of the next closure angle signal $U_{12}$. At that time, the count on counter 20 is preset to the count then existing on counter 17. Counter 20 then counts down. During the counting process, a signal U21 appears at the output of zero detect circuit 21. This signal is applied to the other input of OR gate 14 and is thus added onto the angle closure signal $U_{12}$, since current continues to flow in ignition output stage 13 throughout the time of signal U21 as well as that of signal $U_{12}$. Only when the count of zero is reached in counter 20 does a "0" signal appear at the output of zero detect circuit 21. A spark will thus be generated when counter 20 reaches the value of zero. Further, the trailing edge of signal U21 causes a further counting signal to be applied to counter 23. The binary number 2 appears at the output of counter 23. This causes the signal of frequency F3 to be applied by selector circuit 25 to the counting input of counter 20. The next ignition timing signal causes counter 20 to be preset. Counter 20 now counts down at the higher frequency F3 causing the additional angle signal to have a decreased width. The same process repeats and the even higher frequencies F2 and F1 are applied in turn to counter 20. The additional angle signal has a smaller and smaller width, causing the total closure angle U14 to decrease almost continuously until the normal closure angle signal $U_{12}$ is again reached. The torque of the engine therefore increases continuously and a soft and jolt-free acceleration takes place. Counter 23 is a ring counter and for the example illustrated in FIG. 1, changes from a value of 4 back to the value of zero. Counter 20 is then again blocked by the output signal of zero detect circuit 24 until the next trailing edge of a signal U30.

Of course the reduction of the width of the additional angle signal U21 can take place by using a larger number of different frequencies thereby creating a greater number of steps. Further, instead of or in addition to the increase in the counting frequency, a stepwise decrease in the number to which counter 20 is preset can be provided. The decrease in the number to which the counter is preset can also be effected by a multiplexer (selector circuit). Specifically, starting with the count on counter 17, this count can be reduced by either digital subtraction or division by a number of stages selected by the selector circuit.

Figure 3:
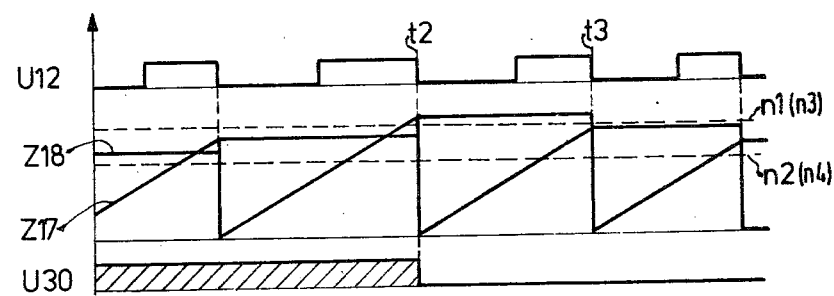
FIG. 3 shows a number of signal vs. time diagrams illustrating the use of speed thresholds in determining the resumption of fuel supply and engine speed limiting.

The fuel supply must be resumed even if the gas pedal 34 is not activated if the speed of the engine is less than a predetermined minimum speed since otherwise the engine would stall, in particular if the decrease in fuel supply was a complete shutoff. The predetermined minimum speed is, for example, 1500 revolutions per minute. A binary number n1 corresponds to this value. If the gas pedal is not activated and the fuel supply is therefore shut off, the engine speed will decrease continuously. This is indicated in FIG. 3 by an increase in width of signal $U_{12}$. Since the distance between successive trailing edges of signal $U_{12}$ increases, the number stored in counter 17 will also increase. This number, as described above, is taken over into counter 18 in response to each ignition timing signal. The value stored in counter 18 therefore increases in a stepwise fashion. A time t2, the count on counter 18 exceeds the number n1, causing comparator 26 to generate a reset signal for flip-flop 28. The output of AND gate 30 changes to a "0" output, valve 37, 38 opens and the fuel supplied to the engine is resumed. This causes an acceleration to take place and signal $U_{12}$ to decrease in width. At time t3 the count n1 is passed, but a set signal for flip-flop 28 is only generated when the count is less than a number n2, that is when, for example, the engine speed is less than 2000 revolutions per minute. Thus, effectively, a switching hysteresis has been generated which prevents a rapid switching of solenoid valve 37, 38. The switching would otherwise take place in synchronism with signal $U_{12}$. The resumption of fuel supply following a decrease or shutoff due to lower engine speeds is of course also accompanied by an ignition timing retardation illustrated in FIG. 2, so that, if the gas pedal is not activated, the engine will oscillate softly between 1500 and 2000 revolutions per minute.

In a very simple version of the present invention, the ignition timing retardation may be eliminated. The jolt upon resumption of fuel supply is then not removed, but a particularly simple and inexpensive construction of the fuel shutoff system is created, particularly for engines having a digital ignition system with quiescent current shutoff. Only blocks 26, 28, 30-38 are then required. With the exception of the switch and solenoid valve, these blocks can easily be integrated onto the chip of the ignition system.

With very little additional expense, it is also possible to accomplish a limiting of the maximum engine speed. The only additional apparatus required are blocks 27, 29 and 35. Let it be assumed that the maximum permissible engine speed is 6000 revolutions per minute and the number n4 corresponds to this speed. If the number stored in counter 18 is less than the number n4, a set signal for flip-flop 29 is furnished at the output of comparator 27. When flip-flop 29 is set, its output, applied through OR gate 35 causes solenoid valve 37, 38 to be energized, causing the fuel supply to be interrupted. If, because of the shutoff fuel supply, the engine speed now decreases below, for example, 5800 revolutions per minute which is signified by the binary number n3, then flip-flop 29 is reset causing a resumption of the fuel supply. The hysteresis created by the two threshold valves n3, n4 prevents a constant back and forth switching of solenoid valve 37, 38.

Various changes and modifications may be made within the scope of the inventive concepts.

We claim:

1. An internal combustion engine system having spark generating means,
means for furnishing a sequence of ignition timing signals each for initiating generation of a spark by said spark generating means,
fuel supply means,
control means connected to said fuel supply means for decreasing said fuel supply from a normal operating supply level during no-load operation of said internal combustion engine and for subsequently re-increasing said supply of said fuel back to said normal operating supply in response to loading on the engine for operation thereof under a predetermined operating condition,
and comprising, in accordance with the invention
means connected to said control means to decrease the jolt on the engine upon re-increase of fuel supply to a normal operating level upon loading of the engine comprising
delay means for initiating an ignition timing delay, in response to said re-increase of fuel supply, thereby delaying at least the first of said ignition timing signals occurring after the start of said re-increasing of said fuel supply, thereby retarding said generation of said spark and decreasing the torque applied to said engine.

2. An internal combustion engine as set forth in claim 1, wherein said delay means comprises means for delaying each of a predetermined plurality of said ignition timing signals occurring after said start of said subsequent re-increasing of said fuel supply.

3. An internal combustion engine as set forth in claim 2, wherein said delay means comprises means for delaying each of said predetermined plurality of ignition timing signals by a delay time having a predetermined relationship to the delay time of the last previous one of said predetermined plurality of ignition timing signals.

4. An internal combustion engine as set forth in claim 3, wherein said delay time of each of said ignition timing signals is less than said delay time of the last previous one of said ignition timing signals.

5. An internal combustion engine as set forth in claim 4, wherein said means for furnishing a sequence of ignition timing signals comprises means (12) for furnishing a sequence of closure angle signals each having a trailing edge constituting one of said ignition timing signals; and
wherein said delay means comprises means (20–25) for adding an additional angle signal to each of said closure angle signals, thereby delaying said furnishing of said ignition timing signal.

6. An internal combustion engine as set forth in claim 5, wherein said adding means comprises means (16) for generating a sequence of counting pulses, first counting means (20) connected to said counting pulse generating means and said ignition timing signal furnishing means for counting said counting pulses during a counting time interval initiated by said ignition timing signal and ending at a predetermined count on said first counting means, and logic means (21, 14) connected to said first counting means and said closure angle signal furnishing means for furnishing said additional angle signal throughout said counting time interval and for combining the so-furnished additional angle signal with said closure angle signal.

7. An internal combustion engine as set forth in claim 6, further comprising means (23, 25) for decreasing said counting time interval in response to each of said predetermined plurality of ignition timing signals.

8. An internal combustion engine as set forth in claim 7, wherein said means for decreasing said counting time interval comprises means for increasing the pulse repetition rate of said sequence of counting pulses.

9. An internal combustion engine as set forth in claim 8, wherein said counting pulse generating means comprises means for generating a predetermined plurality of sequences of counting pulses each having a pulse repetition rate differing from the pulse repetition rate of the others of said sequences;
and wherein said means for increasing said pulse repetition rate of said sequence of counting pulses comprises selector circuit means (25) operative under control of selector signals for applying each of said predetermined plurality of sequences of counting pulses in turn to said first counting means, and means for furnishing said selector signals in response to each of said predetermined plurality of ignition timing signals.

10. An ignition system as set forth in claim 9, wherein said selector signal furnishing means comprises ring counter means (23) and means for advancing said ring counter means by one count in response to each of said delayed ignition timing signals.

11. An internal combustion engine as set forth in claim 6, further comprising means for furnishing a speed-dependent preset signal to said first counting means.

12. An internal combustion engine as set forth in claim 11, wherein said means for furnishing a preset signal comprises second counting means connected to said ignition timing signal furnishing means for periodically counting pulses applied thereto under control of said ignition timing signals and means for applying pulses to said second counting means.

13. An internal combustion engine as set forth in claim 1, further comprising
means for storing energy for said ignition system;
means (17) for furnishing a speed signal indicative of the speed of said engine;
means (19) connected to and controlled by and said speed signal furnishing means and controlling said energy storing means for interrupting current flow through said energy storing means when the speed of said engine is less than a first predetermined speed;
and additional means (26) connected to and controlled by said speed signal furnishing means and controlling said fuel decreasing means for interrupting the operation of said fuel decreasing means when the speed of said engine is less than a second predetermined minimum speed.

14. Engine according to claim 13, further comprising third means (27) connected to and controlled by said speed signal furnishing means to provide a speed limiting signal connected to control said fuel decreasing means to interrupt fuel supply when the speed signal is representative of an engine speed exceeding a predetermined maximum speed.

15. Engine according to claim 14, further comprising a buffer storage means (18) connected between said speed signal furnishing means and said third means (27).

16. Engine according to claim 15, wherein said additional means comprises
a comparator to supply first and second comparator signals;
and a bistable circuit (28) connected to said comparator and to said fuel decreasing means to, respectively, permit or interrupt operation of said fuel decreasing means and introducing switching hysteresis.

17. Engine according to claim 15, wherein said third means comprises a comparator providing first and second output signals in response to respective first and second levels of the speed signal supplied by the speed signal furnishing means;
and a bistable circuit (29) having first and second stable states connected to and controlled by said first and second output signals from the comparator, respectively, to supply the speed limiting signal only when the bistable circuit is in one of said stable states.

* * * * *